(12) United States Patent
Lingam et al.

(10) Patent No.: US 12,294,879 B2
(45) Date of Patent: May 6, 2025

(54) CELLULAR VOICE AND SERVICE DIAGNOSTIC TEST SYSTEM FOR WIRELESS DEVICES

(71) Applicant: Apple Inc., Cupertino, CA (US)

(72) Inventors: Manoj C. Lingam, Dublin, CA (US); Chinshuo Chang, San Jose, CA (US); Gencer Cili, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 460 days.

(21) Appl. No.: 17/822,768

(22) Filed: Aug. 27, 2022

(65) Prior Publication Data
US 2024/0073714 A1    Feb. 29, 2024

(51) Int. Cl.
  *H04B 17/20*  (2015.01)
  *H04B 17/23*  (2015.01)
  (Continued)

(52) U.S. Cl.
  CPC .......... *H04W 24/08* (2013.01); *H04B 17/201* (2023.05); *H04B 17/23* (2015.01); *H04B 17/295* (2023.05); *H04L 41/06* (2013.01); *H04L 41/20* (2013.01); *H04L 41/24* (2013.01); *H04L 43/04* (2013.01); *H04L 43/065* (2013.01); *H04L 43/50* (2013.01); *H04W 4/60* (2018.02); *H04W 8/18* (2013.01); *H04W 24/02* (2013.01);
  (Continued)

(58) Field of Classification Search
  CPC ....... H04B 17/0082–3913; H04L 25/02–4975; H04L 41/02–5096; H04L 43/02–55; H04W 4/50–60; H04W 8/18–245; H04W 16/18–225; H04W 24/02–10; H04W 80/02–12; H04W 84/005–22; H04W 88/005–188; H04W 92/02–24
  See application file for complete search history.

(56) References Cited

U.S. PATENT DOCUMENTS

| | | |
|---|---|---|
| 10,791,459 B1 | 9/2020 | Hu et al. |
| 2012/0252441 A1 | 10/2012 | Fujimoto et al. |
| 2014/0235179 A1* | 8/2014 | George ................. H04W 24/08 |

FOREIGN PATENT DOCUMENTS

| | | | |
|---|---|---|---|
| WO | WO-2016138324 A1 * | 9/2016 | ............ H04W 24/02 |
| WO | 2016202013 A1 | 12/2016 | |

OTHER PUBLICATIONS

PCT Patent Application No. PCT/US2023/029023—International Search Report and Written Opinion dated Oct. 27, 2023.

* cited by examiner

*Primary Examiner* — Timothy J Weidner
(74) *Attorney, Agent, or Firm* — DICKINSON WRIGHT RLLP

(57) ABSTRACT

The described embodiments set forth techniques for diagnostic testing a wireless device configured for cellular wireless service. A test apparatus processes data logs obtained from the wireless device, categorizes observed cellular wireless functionality issues, and provides recommended actions for a service technician and/or a user to take. Exemplary cellular wireless issues include cellular wireless service connectivity, cellular voice call stability, and cellular eSIM profile installation and transfer failures. Recommended actions can include directing a user to contact a mobile network operator with particular observations, adjusting wireless device settings, repair of a wireless device component, updating wireless device software, or replacement of the wireless device.

20 Claims, 17 Drawing Sheets

(51) Int. Cl.
*H04B 17/29* (2015.01)
*H04L 41/00* (2022.01)
*H04L 41/06* (2022.01)
*H04L 43/04* (2022.01)
*H04L 43/065* (2022.01)
*H04L 43/50* (2022.01)
*H04W 4/60* (2018.01)
*H04W 8/18* (2009.01)
*H04W 24/02* (2009.01)
*H04W 24/08* (2009.01)
*H04W 24/10* (2009.01)
*H04W 84/02* (2009.01)
*H04W 88/02* (2009.01)
*H04W 88/18* (2009.01)
*H04W 92/02* (2009.01)

(52) U.S. Cl.
CPC ............ *H04W 24/10* (2013.01); *H04W 84/02* (2013.01); *H04W 88/02* (2013.01); *H04W 88/18* (2013.01); *H04W 92/02* (2013.01)

CELLULAR WIRELESS VOICE CALL ANALYSIS (I)

EXEMPLARY CELLULAR ENGINEERING METRICS

| VOICE METRIC | USE |
|---|---|
| Cellular Call End Details | Diagnose CS Call Failures |
| IMS Call End Event | Diagnose IMS Call Failures |
| Cellular Voice Last Call End | |
| Baseband Cellular Call Reset | Diagnose Modem Crash/Reset Call Failures |
| Baseband Crash | |

| SERVICE METRIC | USE |
|---|---|
| Airplane Mode | Diagnose User Interface Switch Settings That Change Cellular Service Behavior |
| VoLTE Switch | |
| Cellular Data Switch | |
| 4G LTE Switch | |
| 3G Switch | |
| Wi-Fi Calling Switch | |
| Cellular Service Status | Check Device Cellular Service Status (In Service, Limited Service, Out-of-Service) and Measure Signal Strength |
| Baseband Cellular Call Reset Metrics | Diagnose Modem Crash/Reset Call Failures |
| Baseband Comm Center Crash | |
| Cellular Registration Attempt | Check Cellular Service Registration Errors |

| ESIM METRIC | USE |
|---|---|
| Installation Details | Check eSIM Installation Status |
| Cellular Provisioning Details | |
| Cellular Profile Transfer Details | Check eSIM Transfer Status. Diagnose eSIM Source Device to Target Device Transfer Issues |
| IDS Errors | |
| Source Transfer Details | |
| Cellular Monitor Mode Completion | |

EXEMPLARY ISSUE CATEGORIZATION (I)

| CATEGORY | REASON |
|---|---|
| Normal | No Issue (e.g., Call Success) |
| Software | Baseband Reset/Crash<br>VoWi-Fi Call Drop Due to Media Server |
| Network | Congestion<br>CS Fallback Not Allowed<br>Implicit Detachment<br>Device ID Not Derived By Network<br>MSC Not Reachable<br>Network/SYNCH/MAC Failure<br>No EPS Context Activated<br>IMSI Unknown to HSS<br>PLMN/EPS Service/TA/GPRS Service/LA/National Roaming Not Allowed<br>Illegal Device<br>No Suitable Cells |
| Device Setting | Service Option Not Supported<br>Operator Barring<br>Requested Facility Not Available<br>Service/QoS Not Accepted<br>Feature Not Supported |
| Account Setting | IMEI Not Allowed<br>Device Security Mismatch<br>Not Authorized for CSG<br>Request Service Option Not Subscribed<br>Authorization Unacceptable |
| Other Caller | User Alerting No Answer<br>Call Rejection Due to Destination Failure<br>Destination Out of Order |

EXEMPLARY ISSUE CATEGORIZATION (II)

| CATEGORY | REASON |
|---|---|
| Low Signal Strength | Radio Frequency Call Drop |
| SIM Card Issue | SIM Card Unavailable |
| eSIM Network | Mobile Network Operator Issue Impacting eSIM Installation or Transfer |
| eSIM Activation | eSIM Not Activated Due to Installation Failure |
| eSIM Configuration | eSIM Installation or Transfer Failure Due to Lack of Internet Access (Source Device or Target Device) or Not Logged Into Cloud Network-Based Service Account for Transfer |
| eSIM Transfer Error | eSIM Transfer Failure Due to Lack of User Consent or Transfer Declined |
| eSIM Account | eSIM Installation Failure Due to User Account Not Provisioned for eSIM |

*FIG. 8B*

CELLULAR VOICE AND SERVICE DIAGNOSTIC TEST SYSTEM FOR WIRELESS DEVICES

FIELD

The described embodiments set forth techniques for diagnostic testing a wireless device configured for cellular wireless service. A test apparatus processes data logs obtained from the wireless device, categorizes observed cellular wireless functionality issues, and provides recommended actions for a service technician and/or a user to take.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as a subscriber identity module (SIM). Typically, a UICC takes the form of a small removable card, commonly referred to as a SIM card or physical SIM (pSIM) card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more embedded SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. Some newer wireless devices that provide cellular wireless capability may exclude removable SIM cards entirely.

A user of a cellular wireless device may encounter various problems while using the cellular wireless device, such as dropped calls, poor data throughput, or an inability to establish connections. A user of the cellular wireless device may also experience issues when downloading an eSIM profile to the cellular wireless device or transferring cellular wireless service credentials for one or more eSIMs from another device to the cellular wireless device. There exists a need for diagnostic test tools to assist a service technician to determine potential causes and solutions for cellular wireless voice/service issues encountered by the user of the cellular wireless device.

SUMMARY

The described embodiments set forth techniques for diagnostic testing a wireless device configured for cellular wireless service. A test apparatus processes cellular wireless binary metric data logs obtained from the wireless device, categorizes observed cellular wireless functionality issues, and provides recommended actions for a service technician and/or a user to take. Exemplary cellular wireless issues include cellular wireless service connectivity, cellular voice call stability, and cellular eSIM profile installation and transfer failures. Recommended actions can include directing a user to contact a mobile network operator with particular observations, adjusting wireless device settings, repair of a wireless device component, updating wireless device software, or replacement of the wireless device. A cellular diagnostics test setup can include a diagnostics application on the user's wireless device, a service toolkit application on a service technician's computing device, and a cellular wireless analyzer application on a service toolkit network-based server. A cellular diagnostics test flow can include a service technician initiating a diagnostics test on the computing device, e.g., a tablet computer, via the service toolkit application and interacting with the user's wireless device to initiate the diagnostics application on the user's wireless device, after securing user consent to service the user's wireless device. The diagnostics application can be initiated by the user's wireless device scanning a quick response (QR) code displayed on the service technician's computing device or via a settings menu item on the user's wireless device. The cellular wireless analyzer application on the service toolkit network-based server requests a set of cellular wireless metric data logs from the diagnostics application on the user's wireless device, which uploads the cellular wireless metric data logs to the service toolkit network-based server. The cellular wireless metric data logs include a history of cellular wireless metrics observed over a recent time period, e.g., last two weeks. The cellular wireless analyzer processes the cellular wireless network data logs and transfers test results to the service toolkit application of the service technician's computing device, which displays the test results with a summary report and recommended actions to take. The service technician can advise the customer of appropriate actions to take to resolve the cellular wireless functionality issues observed. Cellular wireless service issues can be categorized into specific areas to address such as software management, SIM/eSIM profile management, 3GPP standardized rejection codes, cellular service account settings, or weak cellular wireless network signal strength or signal quality. Issues regarding eSIM installation, activation, configuration and/or transfer can also be categorized to assist with eSIM profile management for the user's wireless device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 7 illustrates a table of exemplary cellular engineering metrics tracked by a mobile wireless device and used for analysis of cellular wireless voice and service issues, according to some embodiments.

FIGS. 8A and 8B illustrates tables of exemplary categorizations of cellular wireless service (including eSIM) issues into summary categories, according to some embodiments.

DETAILED DESCRIPTION

Figure 1:
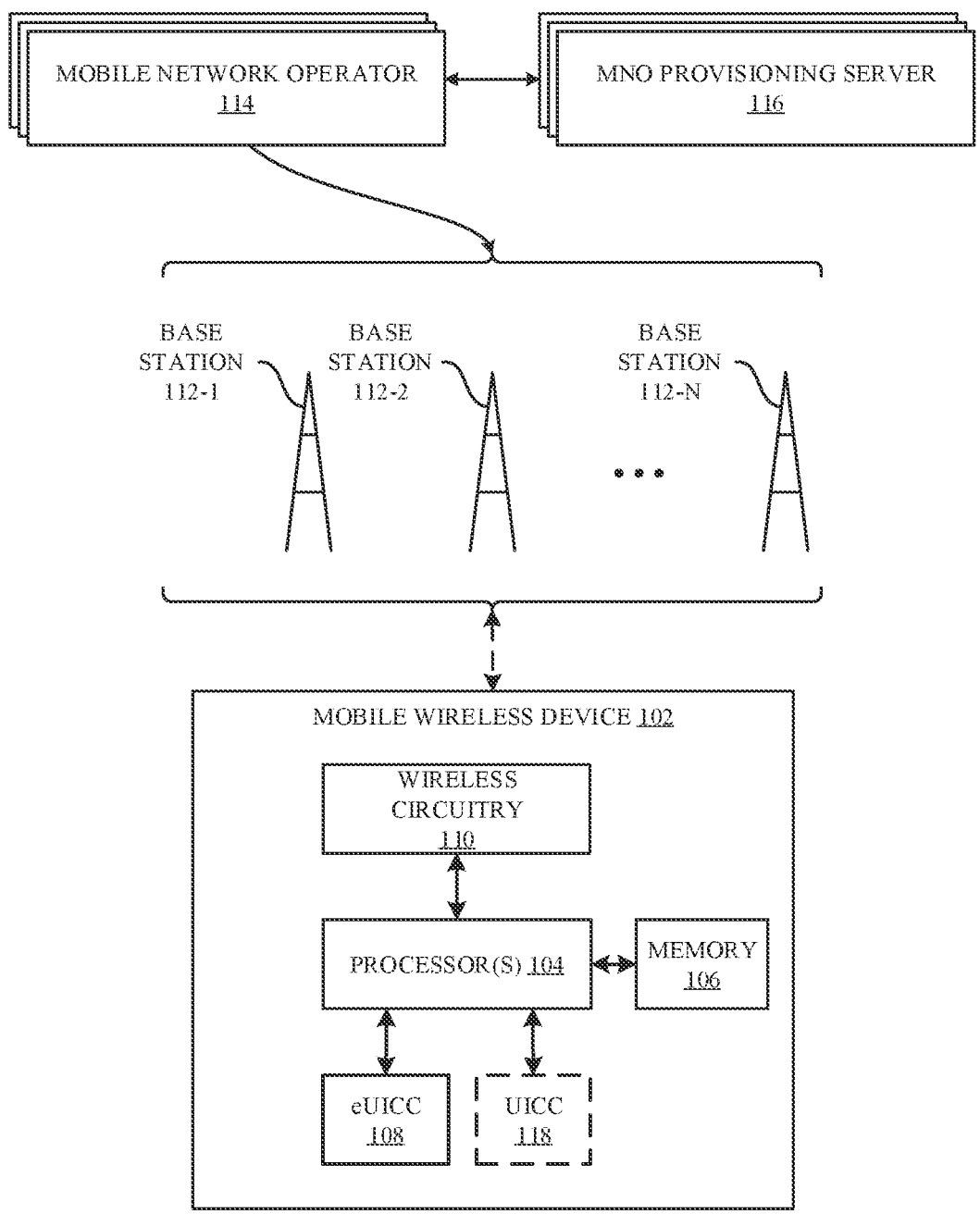
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for diagnostic testing a wireless device configured for cellular wireless service. A test apparatus processes data logs obtained from the wireless device, categorizes observed cellular wireless functionality issues, and provides recommended actions for a service technician and/or a user to take. Exemplary cellular wireless issues include cellular wireless service connectivity, cellular voice call stability, and cellular eSIM profile installation and transfer failures. Recommended actions can include directing a user to contact a mobile network operator with particular observations, adjusting wireless device settings, repair of a wireless device component, updating wireless device software, or replacement of the wireless device.

A cellular diagnostics test setup can include a diagnostics application on the user's wireless device, a service toolkit application on a service technician's computing device, and a cellular wireless analyzer application on a service toolkit network-based server. A baseband cellular wireless processor in the user's wireless device tracks modem metrics and events, information about which can be provided regularly to an applications processor of the user's wireless device to tabulate in a binary metric data log covering a recent time period, e.g., the last two weeks. In some embodiments, the baseband cellular wireless processor accumulates the modem metrics and events and forms the binary metric data log, which is provided to the applications processor on demand or at regular intervals. The binary metric data log can reside securely on the user's wireless device and are accessed for cellular service diagnostics only with permission of a user of the user's wireless device.

A user can contact a service technician, e.g., in person at a retail location, or remotely via a network connection. The service technician initiates diagnostic testing of the user's wireless device by first obtaining a unique hardware identifier of the user's wireless device, e.g., a device serial number, a mobile equipment identifier (MEID) value, or an international mobile equipment identifier (IMEI) value. The service technician enters the unique hardware identifier to a service toolkit application running on the service technician's computing device, e.g., a tablet computer, to initiate a service diagnostics test session. The service toolkit application can include different types of diagnostic tests to perform applicable to the user's wireless device. A corresponding diagnostics application on the user's wireless device can be initiated by using a camera of the user's wireless device to scan a quick response (QR) code displayed on the service technician's computing device or via selection of a settings menu item on the user's wireless device. To protect user privacy, the diagnostics application will proceed only after a user agrees to share information collected by the user's wireless device, e.g., the binary cellular wireless metric data logs.

With the diagnostics application active on the user's wireless device, a cellular wireless analyzer application on a centralized service toolkit network-based server requests access to the binary cellular wireless metric data logs from the diagnostics application on the user's wireless device, which uploads the cellular wireless metric data logs to the service toolkit network-based server. The cellular wireless metric data logs include a history of cellular wireless metrics observed over a recent time period, e.g., last two weeks. The cellular wireless analyzer decodes and processes the binary cellular wireless metric data logs and categorizes cellular wireless service and voice call issues observed by the user's wireless device. The cellular wireless analyzer transfers results of the analysis to the service toolkit application of the service technician's wireless device, which displays the test results with a summary report and recommended actions to take. The service technician can obtain details of observed cellular wireless service and voice call data, such as a number of voice calls made, and specific issues observed, such as a number of failed voice calls and reasons for their failure. The test results can include, in some embodiments, recommended actions for the user and/or for the service technician. The service technician can advise the customer of appropriate actions to take to assist with resolving the cellular wireless functionality issues observed. Cellular wireless service issues can be categorized into specific areas to address such as software management, SIM/eSIM profile management, 3GPP standardized rejection codes, cellular service account settings, or weak cellular wireless network signal strength or signal quality. Issues regarding eSIM installation, activation, configuration and/or transfer can also be categorized to assist with eSIM profile management for the user's wireless device.

These and other embodiments are discussed below with reference to FIGS. 1-10; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of MNO provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 is capable of including one or more physical UICCs 118, also referred to as Subscriber Identity Module (SIM) cards, in addition to the eUICC 108 but does not include a SIM card installed when testing the mobile wireless device 102. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple embedded SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO, an eSIM is reserved for subsequent download and installation to the eUICC 108. In some embodiments, the eUICC 108 obtains one or more eSIMs from one or more associated MNO provisioning servers 116. The MNO provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

Figure 2:
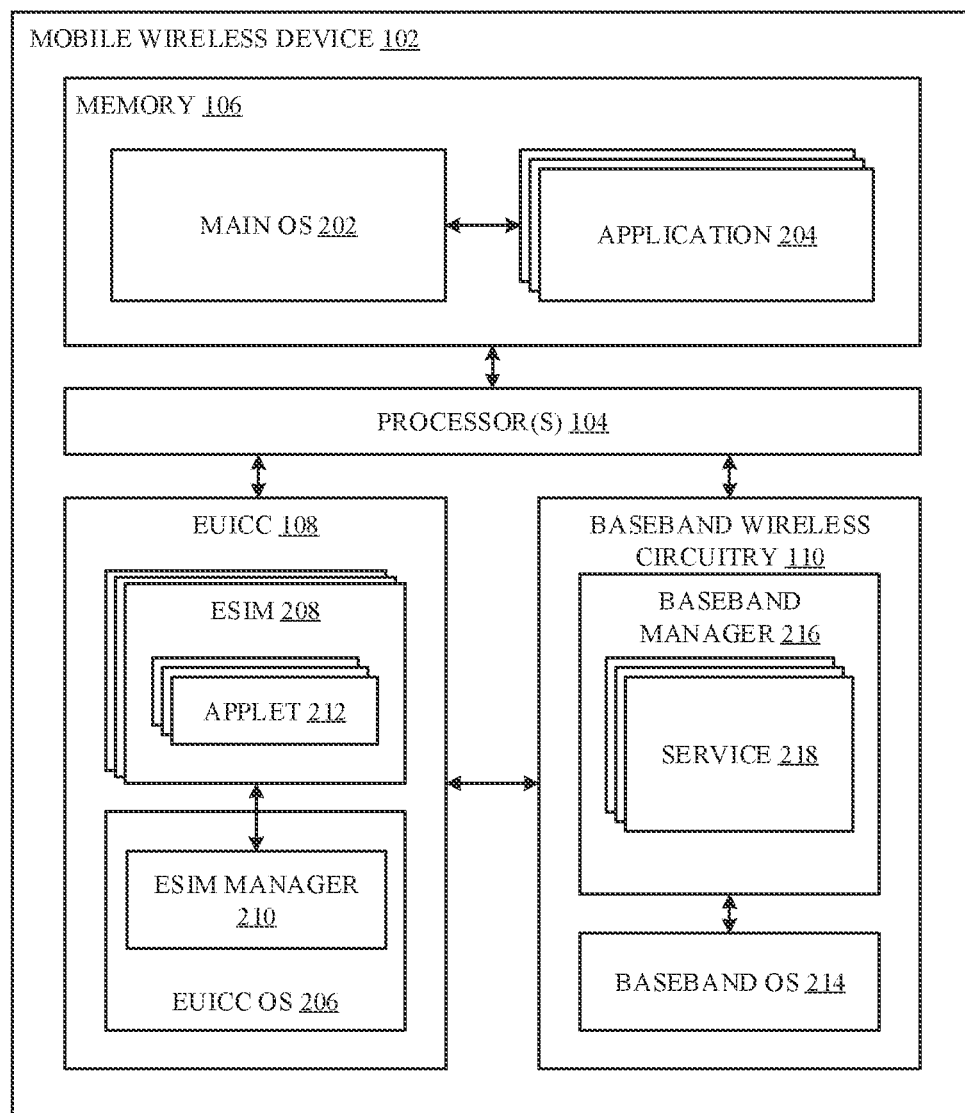
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
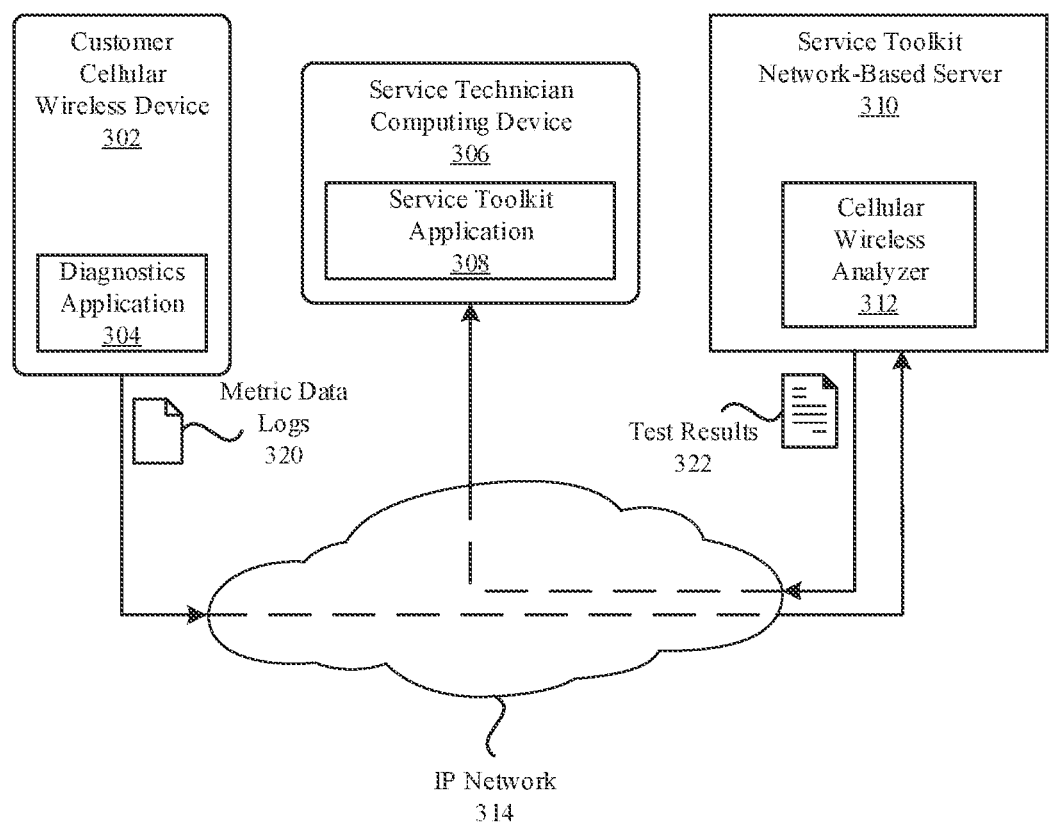
FIG. 3A illustrates an exemplary cellular diagnostics test setup for testing a customer cellular wireless device, according to some embodiments.

FIG. 3A illustrates a diagram 300 of an exemplary cellular diagnostics test setup for testing a customer cellular wireless device 302. The cellular diagnostics test setup provides for classifying issues that affect cellular wireless functionality of the customer cellular wireless device 302, such as mobile network operator (MNO) cellular wireless network issues, radio frequency conditions, cellular wireless baseband software stability, cellular wireless hardware capability, etc. A service technician can interact with a user of the customer cellular wireless device 302 to cause the customer cellular wireless device 302 to provide specific stored information regarding cellular wireless service, e.g., cellular wireless metric data logs 320 compiled over a recent time period, e.g., the last two weeks, to a service toolkit network-based server 310 to process into a set of test results 322. A cellular wireless analyzer 312 resident on the service toolkit network-based server 310 can summarize cellular wireless service issues that affect cellular wireless network connectivity, cellular voice calls, and eSIM profile installations and transfers. The cellular wireless analyzer 312 provides the set of test results 322 to a service toolkit application 308 resident on a service technician computing device 306 that can display information including observations and suggested actions. The service technician can interpret the summarized test results 322 and advise the user of the customer cellular wireless device 302 on next steps to take to assist with resolving observed cellular wireless service issues. Communication between the cellular wireless analyzer 312 of the service toolkit network-based server 310 and both the diagnostics application 304 of the customer cellular wireless device 302 and the service toolkit application 308 of the service technician computing device 306 can be through packet-based data connections via an Internet Protocol (IP) network 314. In some cases, the customer cellular wireless device 302 and the service technician computing device 306 can be co-located to perform cellular wireless service diagnostics. In some cases, the customer cellular wireless device 302 can be located remotely from the service technician computing device 306 during cellular wireless diagnostic testing. A user of the customer cellular wireless device 302 can initiate the diagnostics application 304 via a settings menu item or by scanning a quick response (QR) code provided by the service technician.

Figure 3B:
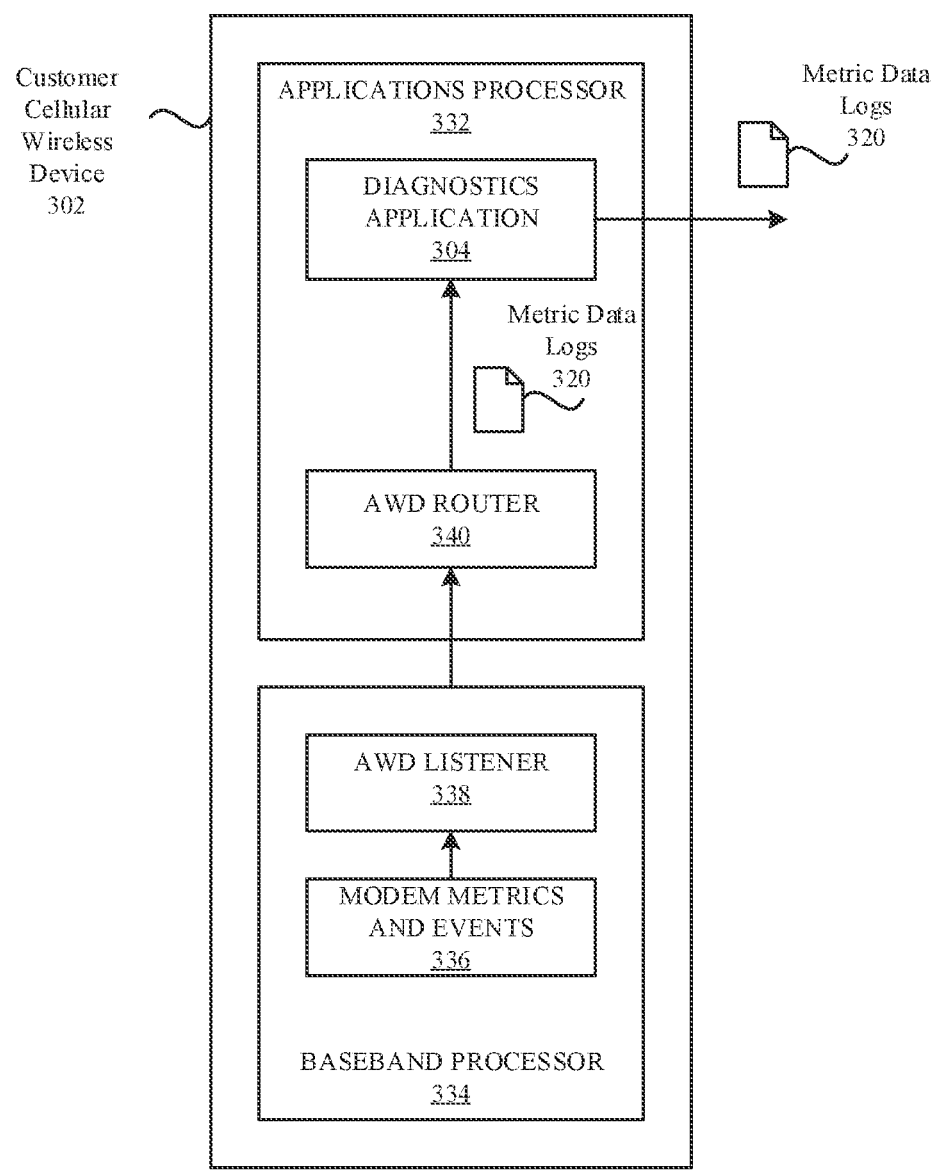
FIG. 3B illustrates additional details of the customer cellular wireless device of FIG. 3A, according to some embodiments.

FIG. 3B illustrates a diagram 330 of additional details of the customer cellular wireless device 302 of FIG. 3A. The customer cellular wireless device 302 includes a baseband processor 334, which can be part of the baseband wireless circuitry 110, that performs baseband cellular wireless functions including establishing cellular wireless device circuit-switched (CS) and packet-switched (PS) voice and/or data connections, monitoring radio frequency signals from cellular wireless networks, and communicating with the eUICC 108 (directly or indirectly via another processor 104), such as when managing eSIMs 208 of the eUICC 108. The baseband processor 334 can include a modem metrics and events module 336 that collects cellular wireless measurements, e.g., serving cell and neighbor cell signal strength and/or signal quality, and tracks various events, e.g., call connection successes, call connection failures, dropped calls, out-of-service (OOS) and in-service transitions, etc. An AWD listener module 338 on the baseband processor 334 provides select data for modem metrics and events that occur to an AWD router module 340 of an applications processor 332 of the customer cellular wireless device 302 to collect in metric data logs 320 that are stored securely in the customer cellular wireless device 302. The metric data logs 320 remain the customer cellular wireless device 302 and are not accessed by or provided to external systems unless approved by a user of the customer cellular wireless device 302, such as part of a cellular wireless service diagnostics test. The diagnostics application 304 of the customer cellular wireless device 302 can provide the metric data logs 320 to an external system, e.g., the service toolkit network-based server 310, for analysis by a cellular wireless analyzer module 312 to assist with diagnostic testing of the customer cellular wireless device 302. The metric data logs 320 can compile various modem metrics and events over a recent period of time, e.g., the last two weeks. The metric data logs 320 can be regularly refreshed with newer data and oldest data can be deleted after a time period. The metric data logs 320 can be formatted as binary data logs and can require decoding and interpretation by the cellular wireless analyzer module 312 of the service toolkit network-based server 310 to be used for the cellular wireless diagnostic testing of the customer cellular wireless device 302.

Figure 4A:
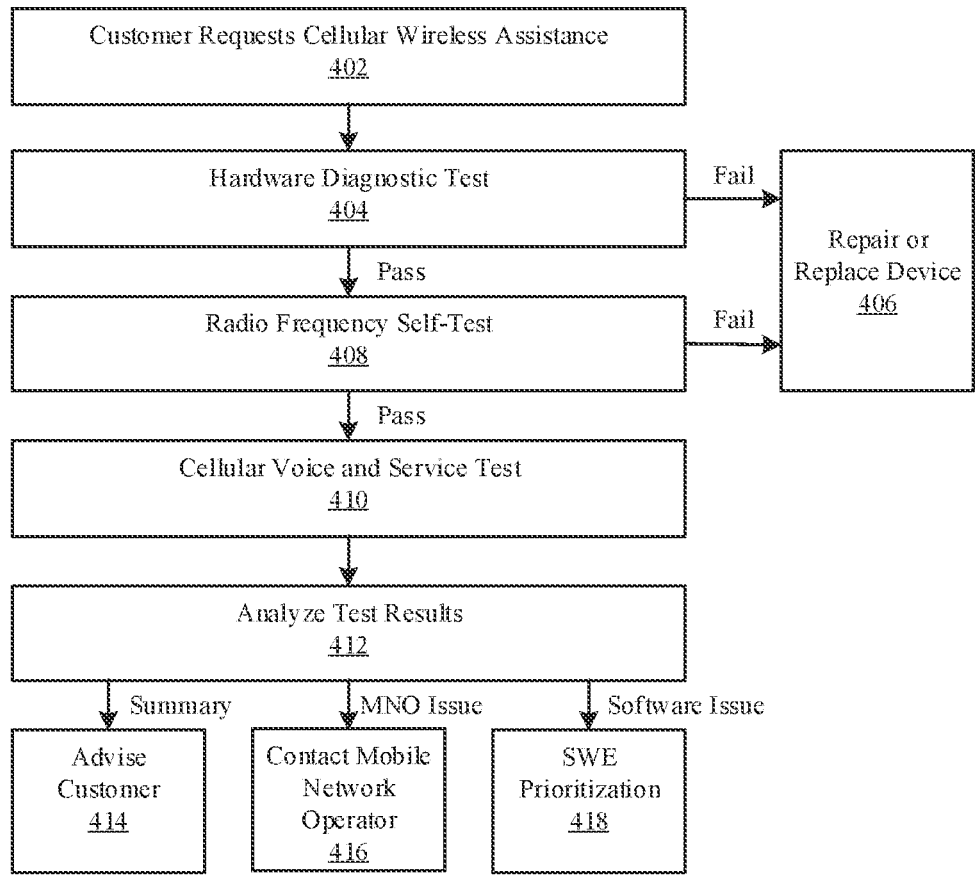
FIG. 4A illustrates an exemplary device diagnostic test flow to analyze a customer cellular wireless device, according to some embodiments.

FIG. 4A illustrates a diagram 400 of an exemplary device diagnostic test flow to analyze a customer cellular wireless device 302. At 402, a customer requests assistance to diagnose one or more cellular wireless issues associated with the customer cellular wireless device 302. The requests can occur in person, such as at a retail outlet, or can occur remotely, such as via an online service request. At 404, a hardware diagnostics test can be performed on the customer cellular wireless device 302 to detect hardware issues, such as related to a processor, memory, or other hardware components of the customer cellular wireless device 302. If the customer cellular wireless device 302 fails the hardware diagnostics test performed at 402, the service technician can recommend, at 406, to repair or replace the customer cellular wireless device 302. If the customer cellular wireless device 302 passes the hardware diagnostics test performed at 402, a cellular wireless specific radio frequency self-test is performed, at 408, to detect possible faults in wireless circuitry 110 or interactions between cellular wireless and other wireless transceivers of the customer cellular wireless device 302. If the customer cellular wireless device 302 fails the radio frequency self-test performed at 408, the service technician can recommend, at 406, to repair or replace the customer cellular wireless device 302. If the customer cellular wireless device 302 passes the radio frequency self-test performed at 408, a cellular voice and service diagnostic test is performed at 410, which can include processing of the cellular wireless metric data logs 320 by the cellular wireless analyzer module 312 of the service toolkit network-based server 310. At 412, test results of the cellular wireless voice and service diagnostic test 410 are analyzed and a summary of the test results can be provided to a service technician, e.g., via a service toolkit application 308 of a service technician computing device 306. Based on the summary of test results, the service technician, at 414, can provide advice to the user of the customer cellular wireless device 302 regarding one or more issues identified and suggested actions to take. In some cases, the service technician can provide information regarding cellular wireless service subscription issues, cellular wireless device settings, cellular wireless network coverage issues, etc. In some cases, one or more mobile network operator (MNO) issues can be identified, and the service technician, at 416, can advise the customer to contact the MNO 114 associated with a cellular wireless service provided by the customer cellular wireless device 302. In some cases, the service technician can provide, to one or more MNOs 114, anonymized information regarding cellular wireless service issues identified via cellular wireless voice and service diagnostics testing of wireless devices 102/302. In some cases, at 418, the service technician can identify a device software issue and provide feedback to the user of the customer cellular wireless device 302 regarding software updates and/or provide information to a device manufacturer software tracking system to allow for prioritization of software issues identified via the cellular wireless voice and service diagnostics testing of wireless devices 102/302.

Figure 4B:
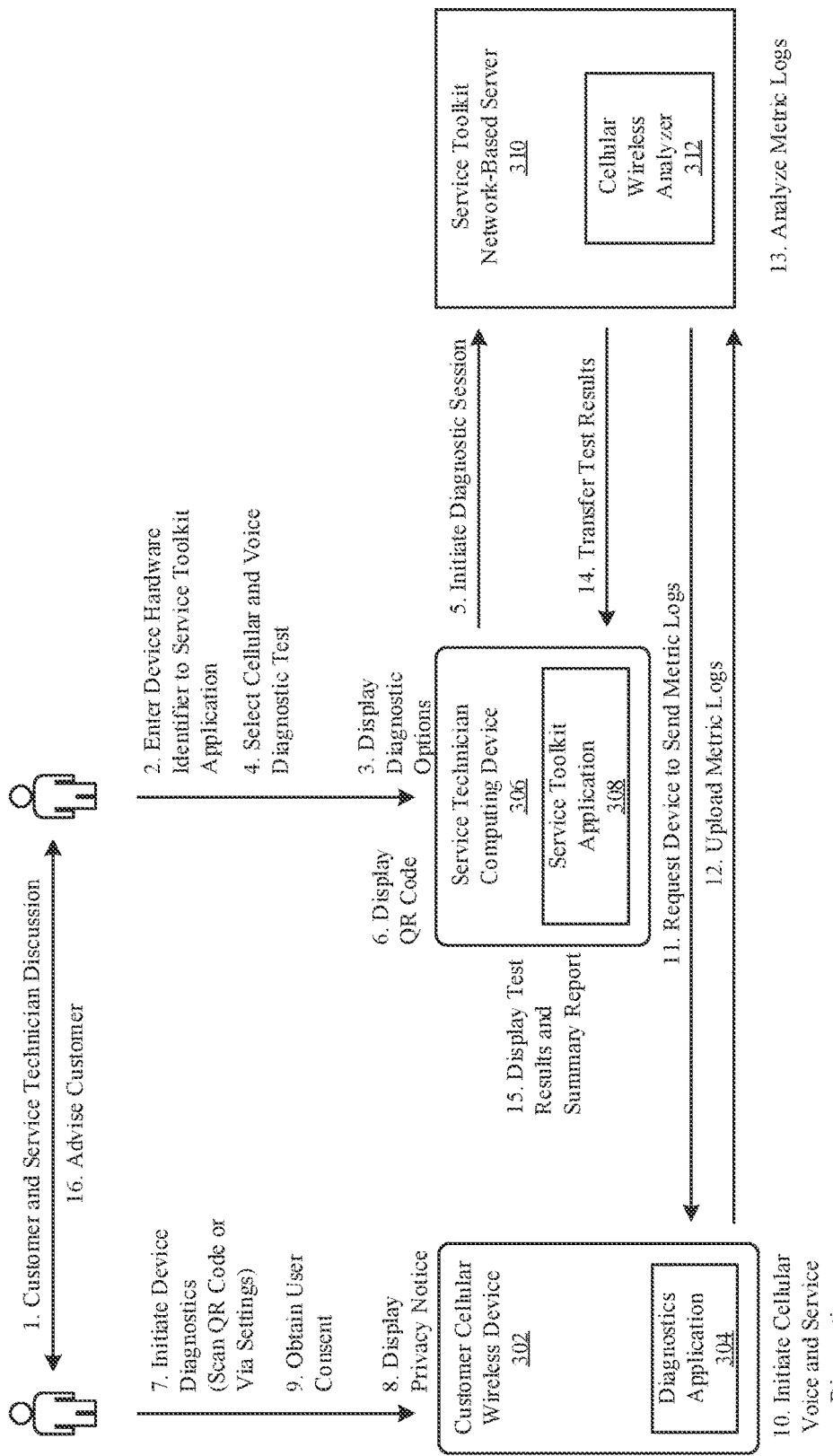
FIG. 4B illustrates an exemplary set of actions undertaken to perform a cellular voice and wireless service diagnostics test procedure for a customer cellular wireless device, according to some embodiments.

FIG. 4B illustrates a diagram 450 of an exemplary set of actions undertaken to perform a cellular voice and wireless service diagnostics test procedure for a customer cellular wireless device 302. Initially, at step 1, a customer and a service technician discuss cellular wireless service issues that the customer may be experiencing with the customer cellular wireless device 302. The service technician, at step 2, can initiate a cellular wireless diagnostics test process by obtaining a unique hardware identifier (ID) value of the customer cellular wireless device 302, e.g., a device serial number, a mobile equipment identifier (MEID) value, or an international mobile equipment identifier (IMEI) value, and entering the unique hardware identifier of the customer cellular wireless device 302 to a service toolkit application 308 resident on a service technician computing device 306. The service toolkit application 308, at step 3, can display a list of diagnostic tests available to perform for the customer cellular wireless device 302 associated with the entered unique hardware ID value. Exemplary diagnostic tests can include the aforementioned hardware diagnostic test 404, RF self-test 408, and cellular voice and service diagnostic test 410. At step 4, the service technician selects the cellular voice and service diagnostic test 410 to perform for the customer cellular wireless device 302. At step 5, the service toolkit application 308 sends a message to the service toolkit network-based server 310 to initiate a cellular voice and service diagnostic test 410 for the customer cellular wireless device 302. The message sent to the service toolkit network-based server 310 can include the unique hardware ID of the customer cellular wireless device 302. The service toolkit application 308 of the service technician computing device 306 can display a QR code, at step 6, which can be scanned, at step 7, by the customer cellular wireless device 302 to initiate a diagnostics session on the customer cellular wireless device 302. In some embodiments, a user of the customer cellular wireless device 302 can initiate the diagnostics session by selecting an input via a settings menu of the customer cellular wireless device 302. As the diagnostics session can require access to the metric data logs 320, at step 8, the customer cellular wireless device 302 presents a privacy notice advising the customer and requesting access to the metric data logs 320. At step 9, the customer cellular wireless device 302 receives user consent to proceed with the diagnostics test session and allow access to the metric data logs 320 stored on the customer cellular wireless device 302. At step 10, a cellular voice and service diagnostics session is initiated on the customer cellular wireless device 302. At step 11, the service toolkit network-based server 310 sends a request to the customer cellular wireless device 302 for the metric data logs 320. At step 12, the diagnostics application 304 of the customer cellular wireless device 302 uploads the metric data logs 320 to the service toolkit network-based server 310, which processes the metric data logs 320, at step 13, using the cellular wireless analyzer module 312. The service toolkit network-based server 310, at step 14, transfers test results, output by the cellular wireless analyzer 312, to the service toolkit application 308 of the service technician computing device 306, which displays the test results and a summary report at step 15. The serviced technician reviews the test results and summary report and advises the customer, at step 16, of issues identified by the cellular wireless voice and service diagnostics session and recommends next steps to take to assist with resolving one or more of the identified issues. Issues can be categorized by the cellular wireless analyzer and presented grouped into applicable categories, such as related to cellular wireless network specific issues, cellular wireless software issues, cellular wireless service account issues, SIM/eSIM profile issues, etc.

Figure 5A:
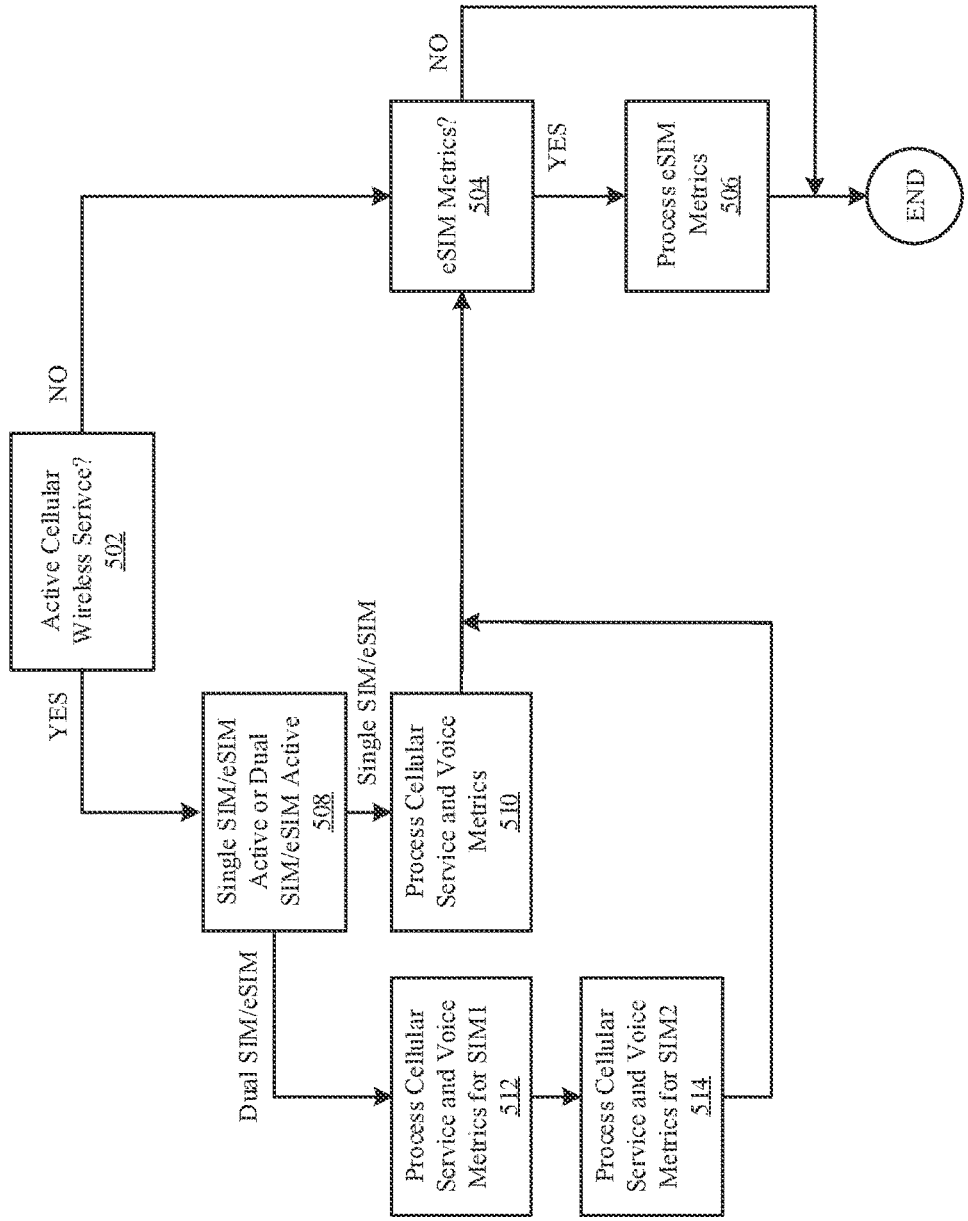
FIG. 5A illustrates an overview flowchart of an exemplary cellular wireless analysis performed by a cellular wireless analyzer module of a service toolkit network-based server, according to some embodiments.

FIG. 5A illustrates an overview flowchart 500 of an exemplary cellular wireless analysis performed by a cellular wireless analyzer module 312 of a service toolkit network-based server 310. At 502, the cellular wireless analyzer module 312 determines whether the customer cellular wireless device 302, for which a cellular wireless diagnostics test is performed using metric data logs 320 obtained from the customer cellular wireless device 302, has an installed and enabled SIM or eSIM 208 that provides access to cellular wireless service. When no SIM/eSIM is enabled and active on the customer cellular wireless device 302, the cellular wireless analysis proceeds, at 504, to determine whether there are data metrics associated with an eSIM 208 included in the metric data logs 320. When there are eSIM data metrics available in the metric data logs 320, the cellular wireless analyzer module 312, at 506, processes the eSIM data metrics to produce a set of eSIM test results that can be used to diagnose cellular wireless issues associated with installation and/or transfer of an eSIM 208 by the customer cellular wireless device 302. When at least one SIM/eSIM is enabled and active on the customer cellular wireless device 302, the cellular wireless analyzer module 312, at 508, distinguishes between a cellular wireless device with a single SIM or eSIM 208 enabled and active and a cellular wireless device with two enabled and active SIMs and/or eSIMs 208. When the customer cellular wireless device 302 has only a single SIM or eSIM 208 enabled and active, the cellular wireless analyzer module 312, at 510, processes cellular service and voice metrics included in the metric data logs 320 for the single SIM or eSIM 208. When the customer cellular wireless device 302 has two enabled and active SIMs and/or eSIMs 208, the cellular wireless analyzer module 312, at 512, 514, processes cellular service and voice metrics included in the metric data logs 320 for each SIM or eSIM 208 separately. After processing the cellular service and voice metrics, the cellular wireless analyzer module 312 continues, at 504, 506, by analyzing additional eSIM metrics included in the metric data logs 320 associated with installation and/or transfer of one or more eSIMs 208 to or from the customer cellular wireless device 302.

Figure 5B:
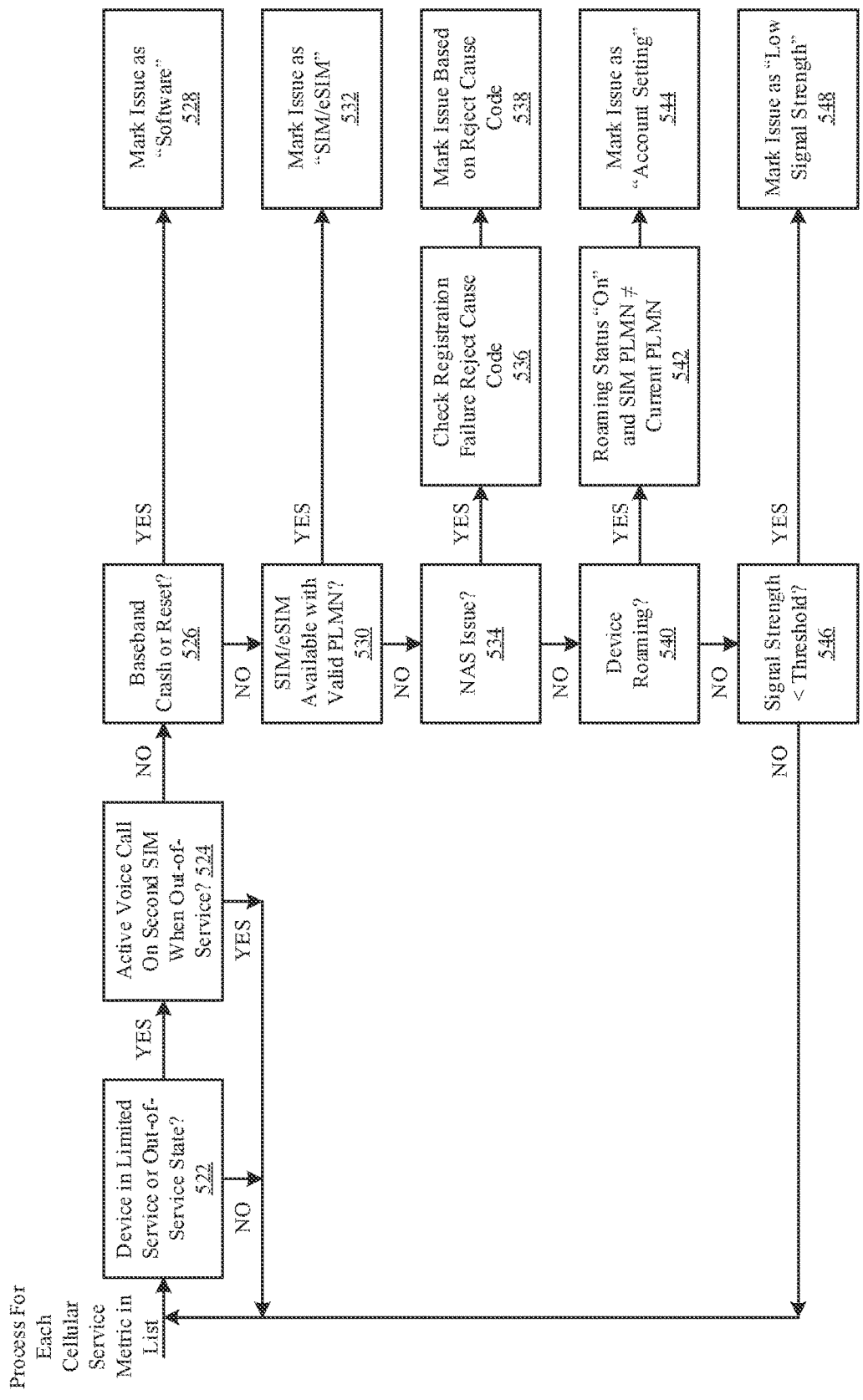
FIG. 5B illustrates a detailed flowchart of an exemplary analysis of cellular service performed by the cellular wireless analyzer of the service toolkit network-based server, according to some embodiments.

FIG. 5B illustrates a detailed flowchart 520 of an exemplary analysis of cellular service performed by the cellular wireless analyzer 312 of the service toolkit network-based server 310. The cellular wireless analyzer 312 can process metric data logs 320 obtained from the customer cellular wireless device 302 for one or more SIMs and/or eSIMs 208. Issues can be identified and classified into different categories to assist with resolution of observed cellular wireless service problems. The metric data logs 320 can include multiple cellular service metrics in a sequential list, and the cellular wireless analyzer 312 can process each cellular service metric in the sequential list to identify and classify one or more issues. At 522, the cellular wireless analyzer 312 determines for the metric whether the customer cellular wireless device 302 was in a limited service state or in an out-of-service (OOS) state, which can indicate a possible cellular wireless service issue. When the customer cellular wireless device 302 is not in a limited service state or in the OOS state, e.g., in a normal operational state, the associated metric is skipped, and the cellular wireless analyzer 312 proceeds to the next metric in the metric data logs 320 list. When the customer cellular wireless device 302 is in a limited service state or in the OOS state for the associated metric, the cellular wireless analyzer 312 determines, at 524, whether active voice call was ongoing via a second SIM or eSIM 208 (i.e., different from the SIM or eSIM 208 for which metrics are being analyzed) when the OOS condition occurred. When the metric indicates an active voice call using a second SIM or eSIM 208 existed in parallel with the OOS condition, the metric is skipped, and the cellular wireless analyzer 312 proceeds to the next metric in the metric data logs 320 list. When the metric is associated with a limited service state or OOS state for a single active SIM or eSIM 208, the cellular wireless analyzer 312 classifies the metric, which indicates a potential underlying issue, into different categories. When the cellular wireless analyzer 312 determines, at 526, that the metric indicates that the baseband wireless circuitry 110 crashed or reset, the cellular wireless analyzer 312 categorizes the metric as a software issue at 528. When the cellular wireless analyzer 312 determines, at 530, that the metric indicates that the SIM or eSIM 208 is available and associated with a valid public land mobile network (PLMN), the cellular wireless analyzer 312 categorizes the metric as a SIM/eSIM issue at 532. When the cellular wireless analyzer 312 determines, at 534, that the metric indicates that a non-access stratum (NAS) issue, e.g., a registration failure, occurred, the cellular wireless analyzer 312 checks, at 536, for a registration failure reject cause code, which can indicate a reason for the NAS issue, and categorizes the metric based on the identified registration failure reject cause code (when available) at 538. When the cellular wireless analyzer 312 determines, at 540, that the metric indicates that the customer cellular wireless device 302 was in a roaming state, the cellular wireless analyzer 312 confirms that a roaming state was activated (e.g., via a cellular settings option) on the customer cellular wireless device 302 and that a PLMN associated with the SIM or eSIM 208 (for which the metric is being analyzed) differs from a PLMN with which the customer cellular wireless device 302 was associated when the metric was logged. After confirmation at 542, the cellular wireless analyzer 312 categorizes the metric as a cellular wireless service account setting issue at 544. When the cellular wireless analyzer 312 determines, at 546, that the metric indicates a received signal strength, e.g., a measured reference signal received power (RSRP) level, from a cell of a cellular wireless network with which the customer cellular wireless device 302 was associated was below a signal strength threshold, the cellular wireless analyzer 312 categorizes the metric as being due to low signal strength at 548. By classifying all the cellular service metrics in the metric data logs 320 for the particular SIM or eSIM 208 into various categories, the cellular wireless analyzer 312 provides to the service technician a compilation of identified issues and recommended actions to take.

Figure 5C:
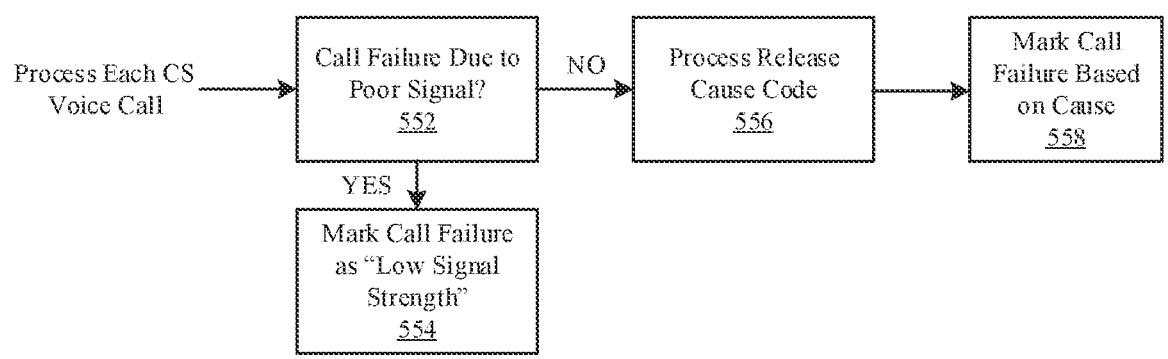
FIGS. 5C and 5D illustrate detailed flowcharts of an exemplary analysis of voice connections performed by the cellular wireless analyzer of the service toolkit network-based server, according to some embodiments.
Figure 5D:
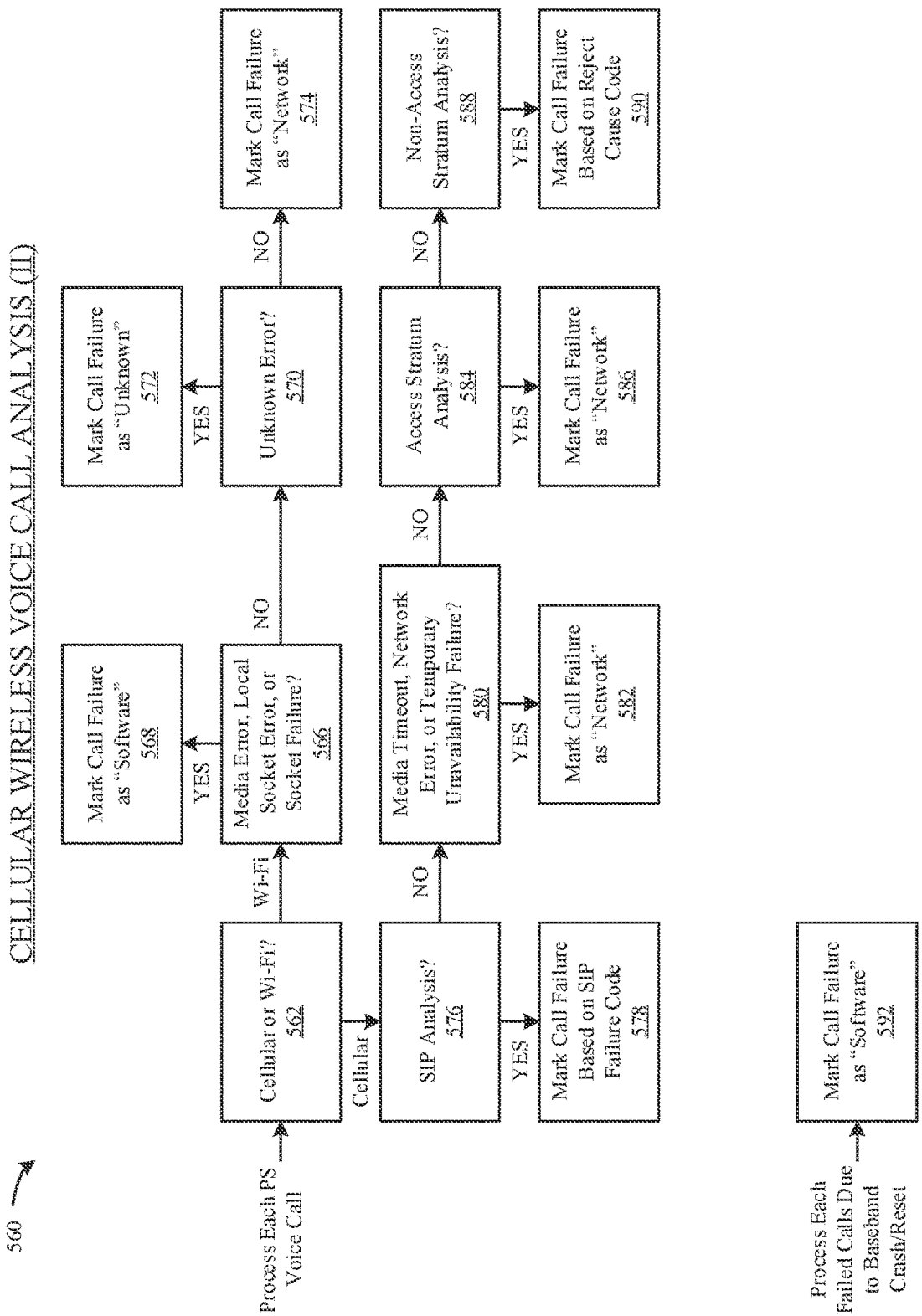

FIGS. 5C and 5D illustrate flowcharts 550, 560 of exemplary cellular wireless analysis of circuit-switched (CS) and packet-switched (PS) voice connections by the cellular wireless analyzer 312 of the service toolkit network-based server 310. As illustrated in the flowchart 550 of FIG. 5C, the cellular wireless analyzer 312 processes, for each CS voice call, CS voice call metrics included in the metric data logs 320 for a particular SIM or eSIM 208 and classifies issues found based on the information included in the metric data logs 320. At 552, the cellular wireless analyzer 312 determines whether a CS voice call failed due to poor signal strength or quality. When the cellular wireless analyzer 312 determines that the CS voice call associated with the metric failed due to poor signal strength or quality, the cellular wireless analyzer 312 classifies the CS voice call failure as a low signal strength issue at 554. When the metric does not indicate that the CS voice call failed due to low signal strength or signal quality, the cellular wireless analyzer 312, at 556, processes a release cause code indicated by the metric and classifies, at 558, the CS voice call failure based on the cause code identified. The release cause code can be provided by the baseband processor 334, e.g., from the modem metrics and events module 336, which can include cause codes obtained from a network entity of a cellular wireless network with which the customer cellular wireless device 302 was in communication.

As illustrated in the flowchart 560 of FIG. 5D, the cellular wireless analyzer 312 processes, for each PS voice call, PS voice call metrics included in the metric data logs 320 for a particular SIM or eSIM 208 and classifies issues found based on the information included in the metric data logs 320. At 562, the cellular wireless analyzer 312 determines whether the PS voice call was via a cellular wireless network or via a non-cellular wireless network (e.g., a Wi-Fi network). For a cellular wireless PS voice call, the cellular wireless analyzer 312, at 576, analyzes any session initiation protocol (SIP) messages available, e.g., from an IP multimedia subsystem (IMS) network entity, and categorizes, at 578, an identified PS voice call failure based on a SIP failure code. When there are no SIP messages available for the PS voice call, the cellular wireless analyzer 312, at 580, determines whether a media timeout, a network error, or a temporary unavailability failure occurred, and when such a failure occurred, the cellular wireless analyzer 312, at 582, categorizes the PS voice call failure as a cellular wireless network issue. The cellular wireless analyzer 312, at 584, further determines whether an access stratum (AS) issue resulted in the PS voice call failure, and when such a failure occurred, the cellular wireless analyzer 312, at 586, also categorizes the PS voice call failure as a cellular wireless network issue. The cellular wireless analyzer 312, at 588, further determines whether a non-access stratum (NAS) issue resulted in the PS voice call failure, and when such a failure occurred, the cellular wireless analyzer 312, at 590, categorizes the PS voice call failure based on a NAS rejection cause code identified in the metric data logs 320. The cellular wireless analyzer 312, at 592, can also process any failed CS or PS voice calls that occurred as a result of a baseband processor crash or reset and categorize such voice call failures as a software issue.

Figure 6:
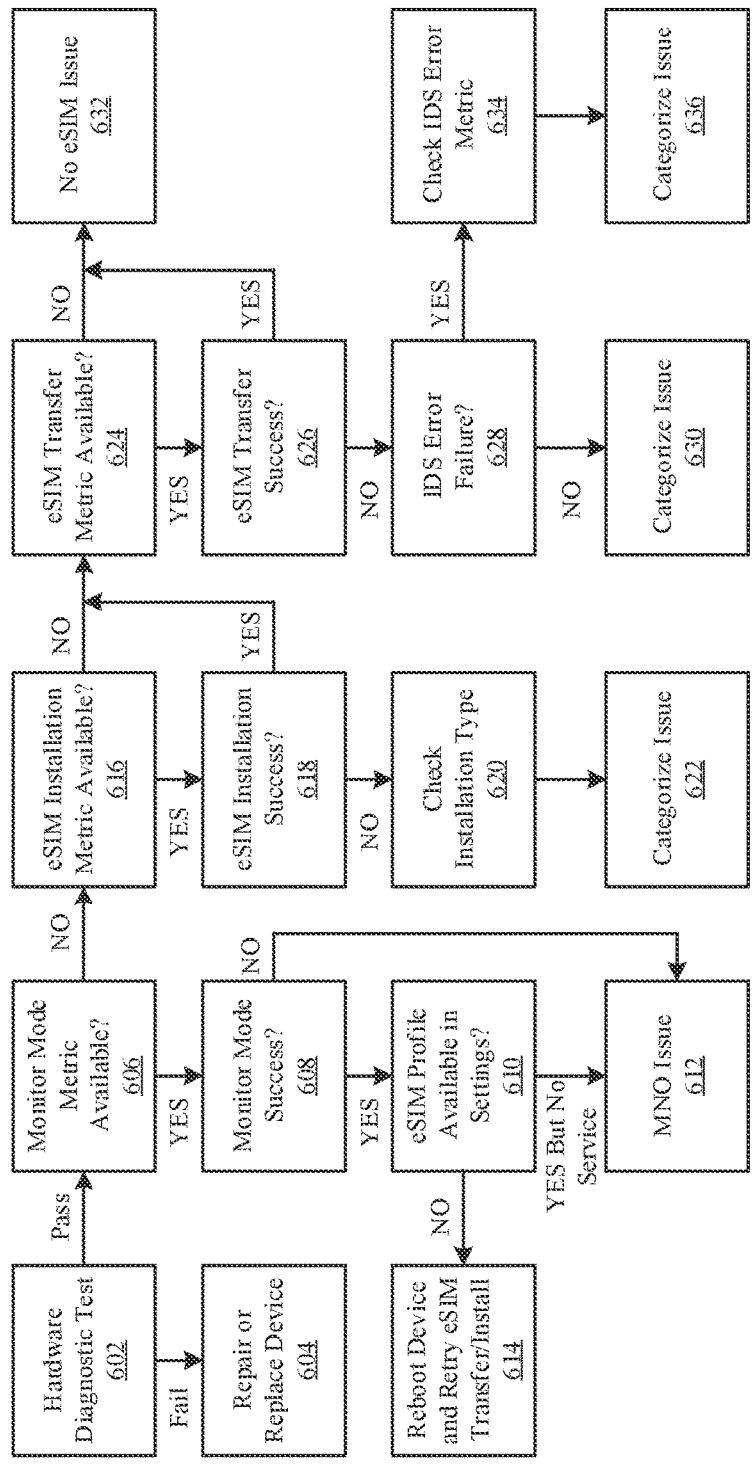
FIG. 6 illustrates a detailed flowchart of an exemplary analysis of installation and transfer of eSIMs for a mobile wireless device by the cellular wireless analyzer of the service toolkit network-based server, according to some embodiments.

FIG. 6 illustrates a flowchart 600 of an exemplary cellular wireless analysis of installation and transfer of eSIMs 208 for a mobile wireless device 102. Failure of installation or transfer of an eSIM 208 can occur as a result of one or more distinct issues, such as a hardware issue on the mobile wireless device 102, a software issue in various components of the mobile wireless device 102, and/or a network issue when communicating data for downloading, installing, and/or transferring an eSIM 208. At 602, the service technician performs a hardware diagnostic test on the mobile wireless device 102 to identify any issues associated with hardware components of the mobile wireless device 102. When the mobile wireless device 102 fails the hardware diagnostic test, the service technician, at 604, can recommend appropriate repairs or replacement for the mobile wireless device 102. When the mobile wireless device 102 passes the hardware diagnostic test, a cellular wireless analyzer 312 of a service toolkit network-based server 310 determines, at 606, whether the metric data logs 320 include a metric associated with a monitor mode used as part of installation and/or transfer of a particular eSIM 208. The analysis described herein can be performed for multiple SIMs and/or eSIMs 208 sequentially or in parallel. The cellular wireless analyzer 312 determines, at 608 using the monitor mode metric, whether a monitor mode associated with an eSIM 208 did not successfully complete, which can indicate that the mobile wireless device 102 was unable to camp on and/or connect to a cellular wireless network associated with the eSIM 208. When the monitor mode was not successful, the cellular wireless analyzer 312 can classify the eSIM failure, at 612, as an MNO 114 issue. When the monitor mode metric indicates that the monitor mode completed successfully, which can indicate that the mobile wireless device 102 was able to camp on and/or connect to a cellular wireless network associated with the eSIM 208, the service technician, at 610 can determine whether the eSIM 208 profile is visible in a settings menu of the mobile wireless device 102. When the eSIM 208 profile is not visible in the settings menu, even though a monitor mode for the eSIM 208 previously completed successfully, the service technician can recommend, at 614, rebooting the mobile wireless device 102 and subsequently reattempting installation and/or transfer of the eSIM 208. When the eSIM 208 profile is visible in the settings menu but no cellular wireless service is available (which can also be indicated in the settings menu), the service technician, at 612, can categorize the eSIM installation and/or transfer failure as an MNO 114 issue. The cellular wireless analyzer 312 can determine availability of an eSIM installation metric, at 616, or an eSIM transfer metric, at 624, and when such a metric is available perform additional analysis using the identified metric. At 618, the cellular wireless analyzer 312 determines whether the eSIM installation metric indicates success or failure, and when an eSIM installation failure occurred, as indicated by the eSIM installation metric, the cellular wireless analyzer 312, at 620, can examine an installation type for the eSIM 208, at 620, e.g., whether an installation procedure used an MNO 114 application or a QR code scan, and subsequently categorize the eSIM installation failure issue, at 622, according to the installation type for the eSIM 208. At 626, the cellular wireless analyzer 312 determines whether the eSIM transfer metric indicates success or failure, and when an eSIM transfer failure occurred, the cellular wireless analyzer 312 determines, at 628, whether the eSIM transfer failed as a result of an error associated with a device manufacturer managed network server (e.g., an IDS error) and, at 634, analyzes a network server (IDS) error metric. The cellular wireless analyzer 312 categorizes the eSIM transfer failure at 630 or at 636 accordingly. When no eSIM installation error or eSIM transfer error has occurred, the cellular wireless analyzer 312 can note, at 632, that there is no identified issue for the eSIM 208.

FIG. 7 illustrates a table 700 of exemplary cellular engineering metrics tracked by a mobile wireless device 102 and used for analysis of cellular wireless voice and service issues. Voice metrics regarding details of how a CS cellular voice call ended can be used to diagnose CS voice call failures. Voice metrics regarding the end of a PS voice call ended can be used to diagnose PS voice call failures. Voice metrics regarding a crash or reset of a baseband processor can be used to diagnose issues associated with the baseband wireless processing circuitry. Service metrics, such as various user-controllable settings including an airplane mode, switches for data use, voice over LTE (VoLTE) use, various radio access technology, e.g., 3G, 4G, 5G, use, or Wi-Fi calling can be used to analyze cellular service behavior based on the combination of settings extant on the mobile wireless device 102 when a cellular issue occurs. Additional service metrics include information regarding registration errors that can occur when registering for cellular wireless service by the mobile wireless device 102 and cellular service status metrics, such as an in-service, limited service, or OOS state, and serving/neighbor cell measurements of signal strength (or signal quality) that can impact cellular connectivity for the mobile wireless device 102. Service metrics can further include information regarding crashes and/or resets of cellular wireless software and/or hardware of the mobile wireless device 102. Metrics associated with eSIMs 208 can include installation and cellular provisioning details to determine eSIM installation status, cellular profile transfer details, errors associated with network-based servers, transfer details for a source device from which an eSIM 208 is transferred, and indications for monitor mode completion after installation of an eSIM 208, which can be used to check for status for transfer of a particular eSIM 208 and to diagnose issues associated with transfer of eSIMs 208 between mobile wireless devices 102, such as from a source device to a target device.

FIGS. 8A and 8B illustrate tables 800, 850 of exemplary categorizations of cellular wireless service (including eSIM) issues into summary categories. The categories can be used to organize test results generated by the cellular wireless analyzer 312 of the service toolkit network-based server 310. A numeric count of distinct issues found in each category can be provided via the service toolkit application 308, and a service technician can examine details for individual issues identified using the service toolkit application 308.

Figure 9A:
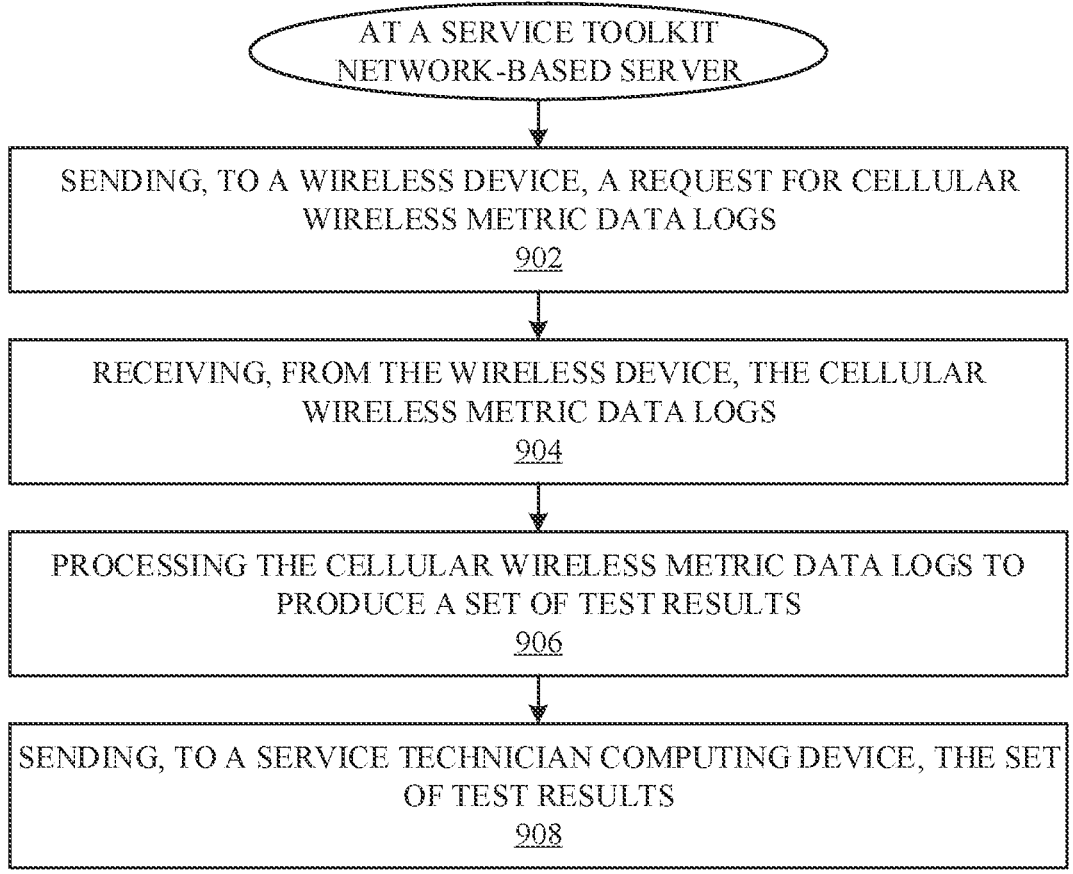
FIG. 9A illustrates a flowchart of an exemplary method performed by a service toolkit network-based server to analyze cellular wireless metric data logs of a wireless device, according to some embodiments.

FIG. 9A illustrates a flowchart 900 of an exemplary method performed by a service toolkit network-based server 310 to analyze cellular wireless metric data logs 320 of a wireless device 102. At 902, the service toolkit network-based server 310 sends, to a wireless device 102, a request for cellular wireless metric data logs 320. At 904, the service toolkit network-based server 310 receives, from the wireless device 102, the cellular wireless metric data logs 320. At 906, the service toolkit network-based server 310 processes the cellular wireless metric data logs 320 to produce a set of test results 322. At 908, the service toolkit network-based server 310 sends, to a service technician computing device 306, the set of test results 322. The set of test results 322 can categorize cellular wireless service issues, observed by baseband wireless circuitry 110 of the wireless device 102, into specific addressable areas and includes recommended actions for issue resolution.

In some embodiments, the cellular wireless metric data logs 320 include voice call connection metrics, cellular wireless network performance measurements, and cellular wireless standardized error codes. In some embodiments, the cellular wireless metric data logs 320 include provisioning, installation, and/or transfer details for an eSIM 208 associated with the wireless device 102. In some embodiments, the specific addressable areas include device issues regarding baseband software management and/or device configuration. In some embodiments, the specific addressable areas include MNO 114 issues regarding cellular wireless network performance and/or cellular service account settings. In some embodiments, the specific addressable areas include eSIM 208 issues regarding installation, activation, configuration, and/or transfer of an eSIM 208. In some embodiments, the specific addressable areas include an MNO 114 network issue affecting installation or transfer of the eSIM 208. In some embodiments, the specific addressable areas include a wireless device connectivity issue affecting installation or transfer of the eSIM 208. In some embodiments, the specific addressable areas include an eSIM transfer failure resulting from a user input or a lack thereof. In some embodiments, the specific addressable areas include an eSIM installation or transfer error resulting from a mismatch of a cellular wireless service account configuration to the eSIM 208. In some embodiments, a diagnostics application 304 of the wireless device 102 provides the cellular wireless metric data logs 320 to a cellular wireless analyzer 312 of the service toolkit network-based server 310 only after obtaining user consent for release of the cellular wireless metric data logs 320.

Figure 9B:
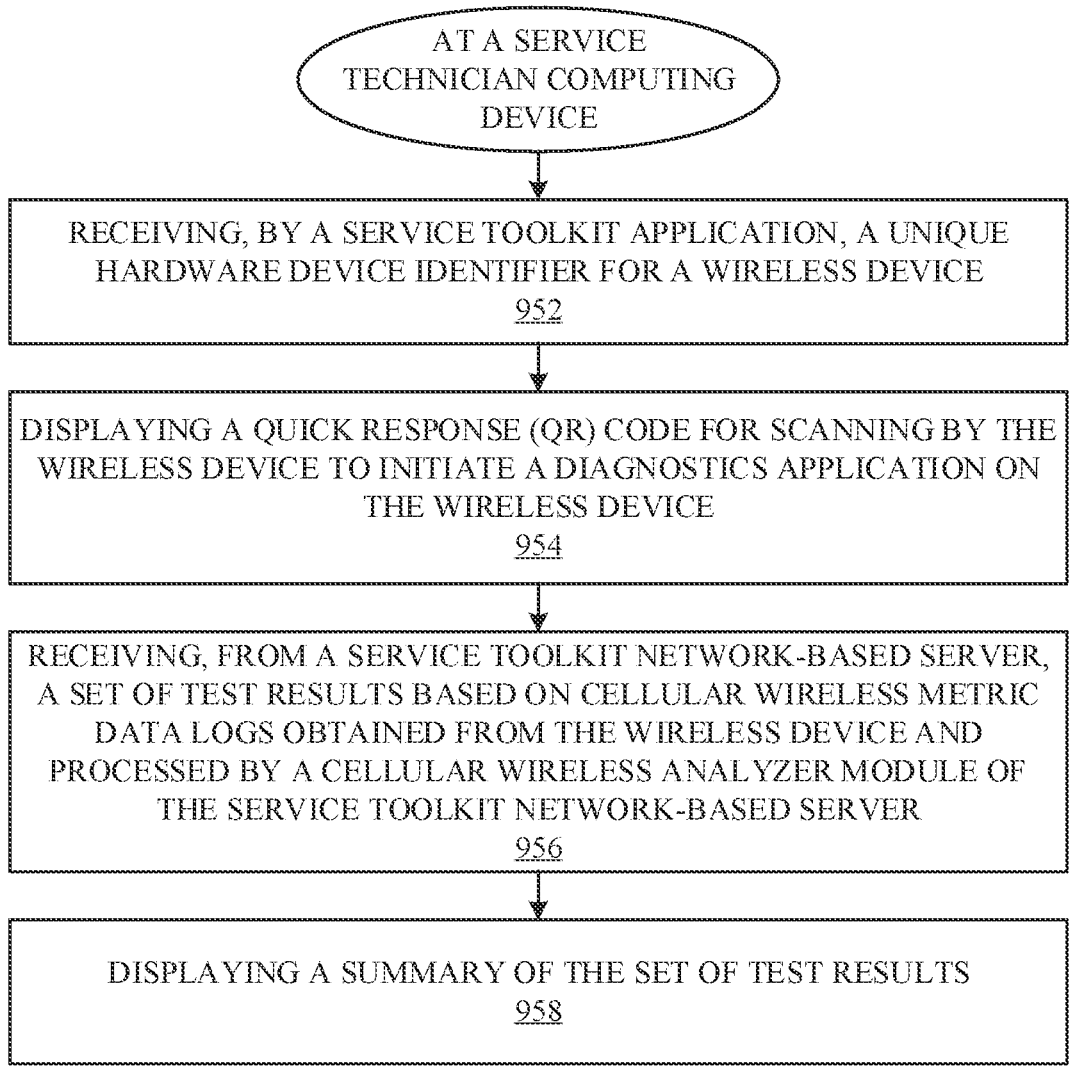
FIG. 9B illustrates a flowchart of an exemplary method performed by a service technician computing device to perform cellular wireless diagnostic testing of a wireless device, according to some embodiments.

FIG. 9B illustrates a flowchart 950 of an exemplary method performed by a service technician computing device 306 to perform cellular wireless diagnostic testing of a wireless device 102. At 952, a service toolkit application 308 of the service technician computing device 306 receives a unique hardware identifier for the wireless device 102. At 954, the service technician computing device 306 displays a QR code for scanning by the wireless device 102 to initiate a diagnostics application 304 on the wireless device 102. At 956, the service technician computing device 306 receives, from a service toolkit network-based server 310, a set of test results 322 based on cellular wireless metric data logs 320 obtained from the wireless device 102 and processed by a cellular wireless analyzer module 312 of the service toolkit network-based server 310. At 958, the service technician computing device 306 displays a summary of the set of test results 322. The set of test results can categorize cellular wireless service issues, observed by baseband wireless circuitry 110 of the wireless device 102, into specific addressable areas and can include recommended actions for issue resolution. In some embodiments, the specific addressable areas include eSIM 208 issues regarding installation, activation, configuration, and/or transfer of an eSIM 208.

Figure 10:
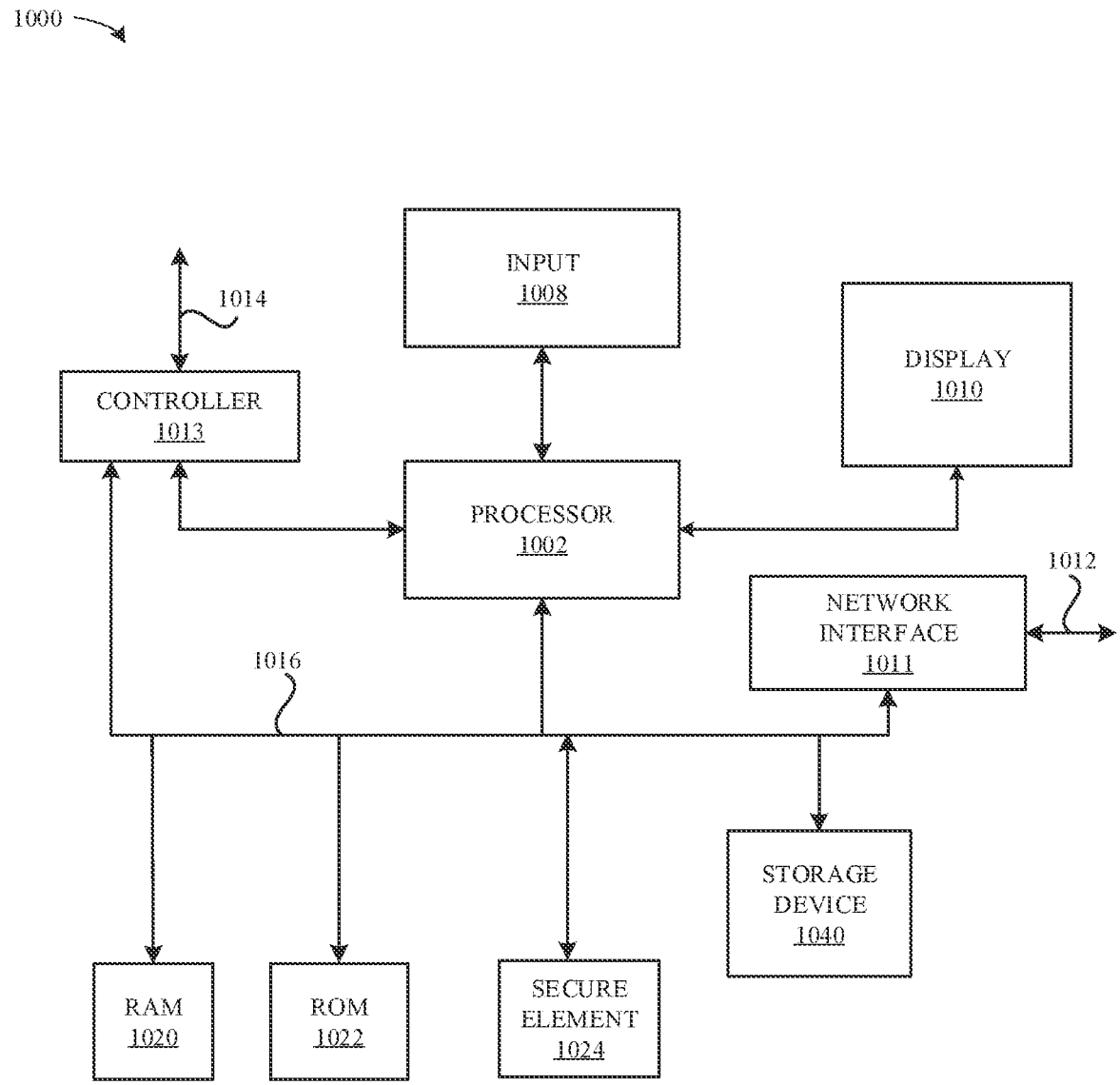
FIG. 10 illustrates a block diagram of exemplary elements of a mobile wireless device, according to some embodiments.

FIG. 10 illustrates a detailed view of a representative computing device 1000 that can be used to implement various methods described herein, according to some embodiments. In particular, the detailed view illustrates various components that can be included in the mobile wireless device 102. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 that can be controlled by the processor 1002 to display information to the user. A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that communicatively couples to a data link 1012. In the case of a wireless connection, the network/bus interface 1011 can include a wireless transceiver.

The computing device 1000 also includes a storage device 1040, which can comprise a single disk or a plurality of disks (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory (RAM) 1020 and a Read-Only Memory (ROM) 1022. The ROM 1022 can store programs, utilities or processes to be executed in a non-volatile manner. The RAM 1020 can provide volatile data storage, and stores instructions related to the operation of the computing device 1000. The computing device 1000 can further include a secure element (SE) 1024, which can represent secure storage for cellular wireless system access by the mobile wireless device 102, such as an eUICC 108 on which to store one or more eSIMs 208 and/or a UICC 118 on which to store a physical SIM (pSIM).

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High-Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for diagnostic testing of a wireless device, the method comprising:
   by a service toolkit network-based server:
   sending, to the wireless device, a request for cellular wireless metric data logs;
   receiving, from the wireless device, the cellular wireless metric data logs;
   processing the cellular wireless metric data logs to produce a set of test results; and
   sending, to a service technician computing device, the set of test results,
   wherein the set of test results categorizes cellular wireless service issues, observed by baseband wireless circuitry of the wireless device, into specific addressable areas and includes recommended actions for issue resolution.

2. The method of claim 1, wherein the cellular wireless metric data logs include voice call connection metrics, cellular wireless network performance measurements, and cellular wireless standardized error codes.

3. The method of claim 1, wherein the cellular wireless metric data logs include provisioning, installation, and/or transfer details for an electronic subscriber identity module (eSIM) associated with the wireless device.

4. The method of claim 1, wherein the specific addressable areas include device issues regarding baseband software management and/or device configuration.

5. The method of claim 1, wherein the specific addressable areas include mobile network operator issues regarding cellular wireless network performance and/or cellular service account settings.

6. The method of claim 1, wherein the specific addressable areas include electronic subscriber identity module (eSIM) issues regarding installation, activation, configuration, and/or transfer of an eSIM.

7. The method of claim 6, wherein the specific addressable areas include a mobile network operator (MNO) network issue affecting installation or transfer of the eSIM.

8. The method of claim 6, wherein the specific addressable areas include a wireless device connectivity issue affecting installation or transfer of the eSIM.

9. The method of claim 6, wherein the specific addressable areas include an eSIM transfer failure resulting from a user input or a lack thereof.

10. The method of claim 6, wherein the specific addressable areas include an eSIM installation or transfer error resulting from a mismatch of a cellular wireless service account configuration to the eSIM.

11. The method of claim 1, wherein a diagnostics application of the wireless device provides the cellular wireless metric data logs to a cellular wireless analyzer of the service toolkit network-based server only after obtaining user consent for release of the cellular wireless metric data logs.

12. A service toolkit network-based server comprising a cellular wireless analyzer application configured to:
   send, to a wireless device, a request for cellular wireless metric data logs;
   receive, from the wireless device, the cellular wireless metric data logs;
   process the cellular wireless metric data logs to produce a set of test results; and
   send, to a service technician computing device, the set of test results,
   wherein the set of test results categorizes cellular wireless service issues, observed by baseband wireless circuitry of the wireless device, into specific addressable areas and includes recommended actions for issue resolution.

13. The service toolkit network-based server of claim 12, wherein the cellular wireless metric data logs include provisioning, installation, and/or transfer details for an electronic subscriber identity module (eSIM) associated with the wireless device.

14. The service toolkit network-based server of claim 12, wherein the specific addressable areas include electronic subscriber identity module (eSIM) issues regarding installation, activation, configuration, and/or transfer of an eSIM.

15. The service toolkit network-based server of claim 14, wherein the specific addressable areas include a mobile network operator (MNO) network issue affecting installation or transfer of the eSIM.

16. The service toolkit network-based server of claim 14, wherein the specific addressable areas include a wireless device connectivity issue affecting installation or transfer of the eSIM.

17. The service toolkit network-based server of claim 14, wherein the specific addressable areas include an eSIM transfer failure resulting from a user input or a lack thereof.

18. The service toolkit network-based server of claim 14, wherein the specific addressable areas include an eSIM installation or transfer error resulting from a mismatch of a cellular wireless service account configuration to the eSIM.

19. A service technician computing device configured for diagnostic testing of a wireless device, the service technician computing device comprising:
  one or more antennas; and
  one or more processors communicatively coupled to the one or more antennas and to a memory storing instructions that, when executed by the one or more processors, configure the service technician computing device to:
    receive, by a service toolkit application, a unique hardware device identifier for the wireless device;
    display a quick response (QR) code for scanning by the wireless device to initiate a diagnostics application on the wireless device;
    receive, from a service toolkit network-based server, a set of test results based on cellular wireless metric data logs obtained from the wireless device and processed by a cellular wireless analyzer module of the service toolkit network-based server; and
    display a summary of the set of test results,
    wherein the set of test results categorizes cellular wireless service issues, observed by baseband wireless circuitry of the wireless device, into specific addressable areas and includes recommended actions for issue resolution.

20. The service technician computing device of claim 19, wherein the specific addressable areas include electronic subscriber identity module (eSIM) issues regarding installation, activation, configuration, and/or transfer of an eSIM.

\* \* \* \* \*